Figure 1:
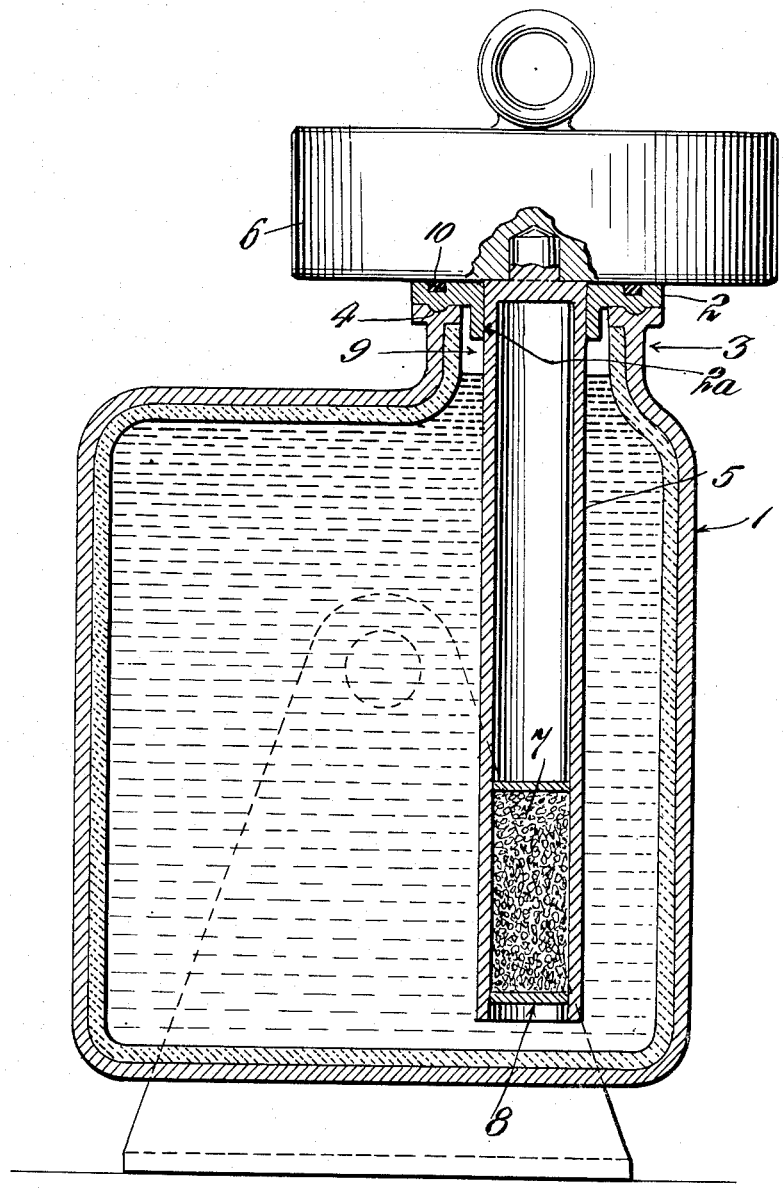

INVENTOR.
HERBERT KLINGBEIL

INVENTOR.
HERBERT KLINGBEIL
BY
ATTORNEY

United States Patent Office 2,776,206
Patented Jan. 1, 1957

2,776,206

METHOD AND APPARATUS FOR INTRODUCING LOW-BOILING SUBSTANCES INTO MOLTEN METAL

Herbert Klingbeil, Dortmund, Germany, assignor to The International Nickel Company, Inc., New York, N. Y., a corporation of Delaware Application July 23, 1954, Serial No. 445,377

Claims priority, application Germany August 1, 1953

4 Claims. (Cl. 75—93)

The present invention relates to a method and apparatus for adding reactive agents to molten metal and, more particularly, to a method and apparatus for adding magnesium to molten cast iron.

A large number of metallurgical processes require the supplementary introduction into red-hot melts of substances which volatilize at relatively low temperatures, such as magnesium, sodium, potassium or cadmium as alloy constituents or as reducing or purifying agents. The introduction of such substances into melts, particularly the introduction of magnesium into cast iron, is very dangerous since the substances vaporize explosively at the moment of contact with the red-hot melt and thus eject considerable quantities of the melt from the vessel. This loss of addition material thus is unproductive.

It has now been discovered that when a reactive agent is added to molten metal under particular conditions, the reactions resulting from the addition are maintained under control in a special manner and by means of a special apparatus so as to avoid losses of agent and of metal and to secure a high recovery of the agent in the treated metal.

It is an object of the present invention to provide a method and apparatus particularly adapted for the controllable addition of reactive agents to molten metal.

It is a further object of the invention to provide a method and apparatus particularly adapted for the addition of magnesium to molten cast iron wherein the reactions attending such addition are controlled.

Other objects and advantages of the invention will become apparent from the following description taken in conjunction with the accompanying drawing which depicts two embodiments of the apparatus contemplated in accordance with the present invention.

Broadly stated, the method embodying the present invention contemplates introducing an addition agent within a bath of molten metal and thereupon restricting the expansion of gases resulting from the attendant addition reactions so as to cause a substantial increase in the pressure exerted on said metal. According to the invention, the substances to be introduced into the melt are introduced by means of a plunger into the melt which has been prepared in a pressure vessel, and the plunger is constructed in a cooperative manner with the pressure vessel such that when the plunger is inserted well within the melt the opening in the pressure vessel through which the plunger is inserted is simultaneously made pressure-tight.

The new process enables the substance to be very quickly introduced deep into the melt, and thus enables the reaction to be carried out in a hermetically-sealed vessel so that all danger from flying melt and all losses of addition material are avoided.

An example of how the invention is carried out is represented in longitudinal section in Figure 1. The device represented in this figure comprises a refractory-lined pressure vessel 1 and a lid 2 having a center opening 2a and said lid being adapted to make a pressure-tight seal with the flanged manhole 3 in the vessel 1, as indicated by the centering ring 4 in the lid 2 which matches the corresponding rabbet of the flange of the manhole 3. The plunger 5 is adapted to be placed through the lid 2 such that the end of the plunger extends deep within the melt which substantially fills the vessel 1. The plunger 5 is unitarily constructed with a loading weight 6 which is adapted to make a pressure-tight seal with the top of the lid 2, thus effectively sealing the manhole 3. When this embodiment of the invention is employed, the vessel 1 is substantially filled by pouring the metal into the vessel through the opening 3 and the lid 2 is set in place. The plunger is thereupon quickly inserted into the vessel through the center opening 2a in the lid 2 until the plunger with its loading weight 6 is seated tightly on the lid as, for example, by means of a sealing ring 10. In this manner, the vessel is shut pressure-tight without the lid 2 having to be specially fastened. In one embodiment, the plunger 5 has a hollow 7 at its lower end into which is placed the substance, e. g., magnesium, which is to be introduced into the metal, e. g., cast iron. The hollow 7 may be temporarily closed at the bottom by a closure 8 which is made of a metal, e. g., iron, which melts at the temperature of the melt, or of a substance, e. g., wood, which burns at that temperature. The thickness of the closure is so chosen that the period of time required for the introduction of the plunger and the seating thereof in the pressure vessel is certain to be less than the time taken for the closure to melt or burn. This assures that the reaction between the melt and the added substance only begins after the plunger has reached its innermost position. In place of the hollow 7 in the plunger, a capsule containing the substance to be introduced can be fastened to the plunger. The capsule may consist of fusible or combustible material and its wall thickness may be made such that it only melts when it is certain that the plunger will have reached its immersed position. When a weight is used to hold the plunger in position in the pressure vessel, it may be chosen to be so great that before a pressure is reached which would be dangerous to the pressure vessel it lifts from its seat like the valve body of a safety valve and releases the gas therefrom. In place of a weight, another load, e. g., applied by means of a spring or by any other convenient means, can be used. The part of the plunger which dips into the melt preferably consists of refractory material or heat-resistant metal or is protected from premature harm by a refractory layer. As soon as the plunger is set into position within the pressure vessel and the closure 8 is melted, the reaction of the melt with the addition material in the hollow 7 of the plunger 5 sets in within the hermetically-sealed pressure vessel 1. The addition agent partly vaporizes and is intimately mixed with the melt by means of the rising vapor bubbles. The pressure in the vessel is increased by vaporization to the value corresponding to the temperature of the melt. The loss of the addition agent through vaporization is minimal since the volume of residual air 9 in the vessel 1 can be kept small.

Figure 2:
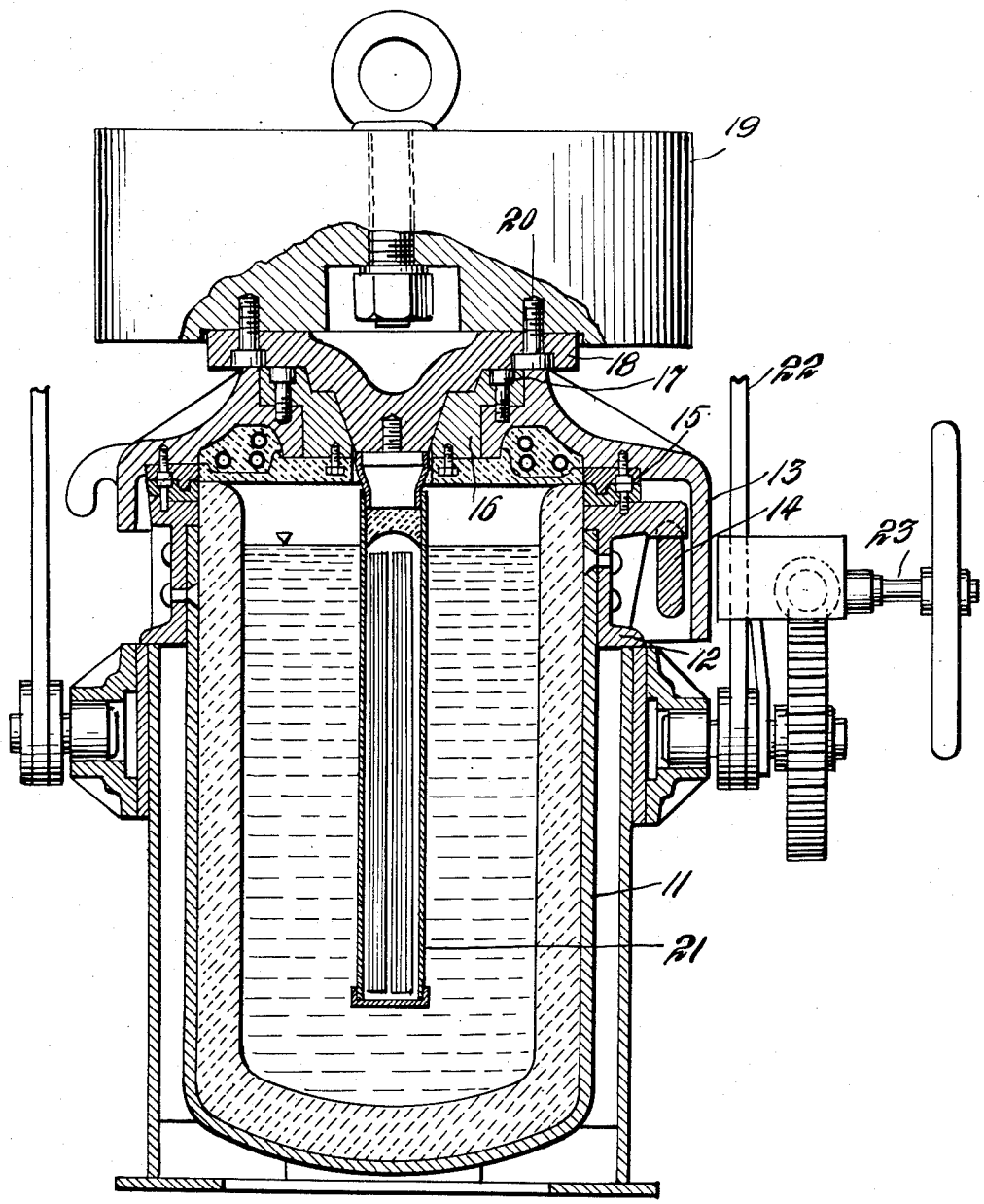

Another example of apparatus contemplated in accordance with the present invention is illustrated in longitudinal section in Figure 2. This apparatus comprises a refractory-lined pressure vessel 11 which may be strengthened on the outside by welded-on stiffeners and which is provided with a key ring 12 rigidly fastened thereto, as by rivets. A cover 13 is firmly but replaceably fastened to key ring 12, as by means of wedges 14, and a pressure seal is effected between cover 13 and key ring 12 by replaceable sealing means, such as the sealing rings 15. In the opening of cover 13 is set a replaceable reducing and guiding ring 16 which is fastened tightly to cover 13, as by means of the screws 17. Guiding ring 16 has disposed therein a central bevelled hole for introduction of the plunger 21. Bevelled stopper 18 is adapted to close the bevelled hole in guiding ring 16 and said stopper is fastened to loading weight 19, as by screws 20, and carries the plunger 21 on its lower end. Plunger 21 may be constructed in the same manner as plunger 5 in Figure 1. The addition material is depicted as being disposed in the hollow of plunger 21 in the form of rods and the end of the plunger is shown capped by means of a cap made of material which is destructible in the molten metal held in vessel 11. The method of operating the apparatus shown in Figure 2 corresponds to that described in connection with Figure 1. In the case of the apparatus shown in Figure 2, the loading weight combined with plunger 21 can be relatively small since it has only to overcome the vapor pressure generated within the pressure vessel and acting upon a small area.

The large lid 13 can readily be removed from the pressure vessel and thereby a large free opening is created through which the whole lining of the ladle is readily accessible. As a further advantage, the bevelled guiding ring 16 is readily replaceable in the event of damage, as from molten metal, etc., so that the apparatus of Figure 2 provides the advantage of ready maintenance. The apparatus may be provided with suitable carrying means 22 and tipping apparatus 23 so that the apparatus can readily be transported and so that molten metal may readily be placed in and removed from the vessel 11.

It will be appreciated that when the method is carried out in the manner described hereinbefore for the purpose of introducing magnesium into molten cast iron, the pressure upon the metal in the sealed pressure vessel is raised substantially to the vapor pressure for magnesium at the temperature of the melt. It will be appreciated that this pressure is indeed substantial.

It will be appreciated that the opening into the pressure vessel should be kept as small as possible. The opening will usually only be large enough for the melt to be easily charged into the vessel and afterwards poured out of it. Since the opening is only of small dimension, a relatively small load will be exerted upon the stopper resulting from the pressure generated within the vessel by the addition reactions. This load can be overcome by a small loading weight or by any other convenient means to hold the stopper closely on its seating.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The process for introducing into molten metal an addition agent having a low vaporization temperature which comprises plunging into a bath of molten metal a metallic agent having a vaporization temperature below the temperature of said bath of molten metal and restricting the expansion of the gas resulting from vaporization of said agent at the temperature of said molten metal such that the pressure upon said bath of molten metal is raised substantially to the vapor pressure of said agent at the temperature of said molten metal.

2. The process for introducing magnesium into a bath of molten cast iron which comprises plunging magnesium into said molten cast iron and restricting the expansion of the gas resulting from vaporization of said magnesium such that the pressure upon said cast iron is raised substantially to the vapor pressure for magnesium at the temperature of said molten cast iron.

3. An addition device adapted for the introduction of magnesium into molten cast iron which comprises a pressure vessel adapted to hold molten cast iron and having a relatively restricted opening in the top thereof, a lid adapted to close said opening in a pressure-tight manner, an elongated plunger adapted to hold magnesium fastened to the bottom of said lid and adapted to extend well within said vessel when said lid is in the closed position so that magnesium held in said plunger will then be under the surface of molten cast iron held in said vessel, and means for applying a load upon said lid in a downward direction when said lid is in the closed position so as to resist the effect of pressure generated within said vessel.

4. An addition device particularly adapted for the introduction of reactive agents into molten metal which comprises a pressure-resistant vessel adapted to hold molten metal, a relatively restricted charging opening therein, a charging device cooperating with said opening and being adapted to form a pressure seal therewith while simultaneously introducing addition material below the surface of molten metal held in said vessel, and means adapted to hold said charging device firmly in place against the effect of pressure generated within said vessel.

References Cited in the file of this patent

UNITED STATES PATENTS

| | | |
|---|---|---|
| 2,485,760 | Millis et al. | Oct. 25, 1949 |

FOREIGN PATENTS

| | | |
|---|---|---|
| 500,391 | Great Britain | Feb. 8, 1939 |
| 64,276 | Switzerland | Mar. 18, 1913 |